United States Patent [19]

Iguchi et al.

[11] Patent Number: 5,406,385
[45] Date of Patent: Apr. 11, 1995

[54] FACSIMILE DEVICE WITH MOTOR STARTUP DURING INITIALIZATION

[75] Inventors: Masayoshi Iguchi; Koji Takeyama, both of Nagoya, Japan

[73] Assignee: Brother Kogyo Kabushiki Kaisha, Aichi, Japan

[21] Appl. No.: 118,418

[22] Filed: Sep. 8, 1993

[30]    Foreign Application Priority Data

Sep. 14, 1992 [JP]    Japan ................. 4-271194

[51] Int. Cl.⁶ ............................... H04N 1/32
[52] U.S. Cl. .................... 358/406; 358/435; 358/436
[58] Field of Search ............. 358/406, 434, 435, 436, 358/438, 439, 463, 468; 479/100

[56]        References Cited
          U.S. PATENT DOCUMENTS 4,630,126 12/1986 Kaku et al. ............... 358/406

*Primary Examiner*—Scott A. Rogers
*Attorney, Agent, or Firm*—Kane, Dalsimer, Sullivan, Kurucz, Levy, Eisele and Richard

[57]        ABSTRACT

A facsimile device transmits image data from a calling station to a facsimile device at a called station over a transmission line. The facsimile device has an image reader for reading image data to be transmitted, and a driver including a motor for actuating the image reader to read the image data. When a TCF signal is transmitted from the calling station to the called station to check the condition of the transmission line, a controller energizes the motor, which results in electrical noise being generated, corrupting the TCF signal. The controller then controls a transmission rate at which the image data is to be transmitted depending on the level of electrical noise in the TCF signal, that is detected at the called station. Since the transmission rate is established depending on the level of electrical noise, communication or decoding errors are reduced during the transmission of the image data.

26 Claims, 4 Drawing Sheets

FACSIMILE DEVICE WITH MOTOR STARTUP DURING INITIALIZATION

FIELD OF THE INVENTION

The present invention relates to a facsimile device, and more particularly to the reduction of transmission errors when a facsimile device is being used.

BACKGROUND OF THE INVENTION

Facsimile devices are subject to various device noises that are produced by internal mechanisms during operation thereof. For example, actuators such as motors for feeding documents and recording sheets tend to generate electrical noise during the transmission and reception of image data.

At the start of a data communication process, a protocol handshake signal known as a TCF (training check) signal for checking the status of the transmission line is transmitted from a calling facsimile device to a called facsimile device. Usually, the actuators are not energized during transmission and reception of the TCF signal since no image data is being sent.

Conventional facsimile devices have certain problems because device noise produced while the protocol TCF signal is being transmitted and received, and device noise produced while image data is being transmitted and received have different levels. More specifically, while the TCF signal Is being transmitted and received, the protocol training check carried out by the TCF signal may be successful since the actuators are not energized and little device noise is generated. However, while image data is being transmitted and received, a relatively high level of device noise is produced since the actuators are energized. If the produced device noise is greater than a predetermined level, then decoding errors or communication errors will occur.

It is difficult or almost impossible to completely remove device noise through hardware design approaches.

SUMMARY OF THE INVENTION

It is therefore an object of the present invention to provide a facsimile device which effects a communication process at a transmission rate depending on the level of device noise that is produced during image data transmission and reception, for thereby reducing decoding errors or communication errors.

According to an aspect of the present invention, there is provided a facsimile device used to transmit and receive data through a modem which further comprises:

actuating means energizable when said data is transmitted;

detecting means for detecting electrical noise generated by said actuating means when said actuating means is energized; and control means for energizing said actuating means when a signal used to check a connected transmission line is transmitted, said control means controlling a rate at which said data is to be transmitted through said transmission line depending on the level of electrical noise that is generated by said actuating means when said signal is transmitted.

According to another aspect of the present invention, there Is provided a facsimile system for transmitting data from a calling station to a called station over a transmission line which further comprises:

image reading means for reading data to be transmitted from said calling station to said called station;

actuating means for actuating said image reading means to read said data at said calling station;

detecting means for detecting electrical noise generated by said actuating means; and control means for transmitting a signal which contains electrical noise generated by said actuating means, said control means energizing said actuating means when said signal is transmitted from said calling station to said called station.

According to a further aspect of the present invention there is provided a facsimile system used to transmit data from a calling station to a called station, wherein said calling station comprises:

image reading means for reading data to be transmitted from said calling station to said called station;

actuating means for actuating said Image reading means to read said data at said calling station; and control means for transmitting a signal which contains electrical noise generated by said actuating means, said control means energizing said actuating means when said signal is transmitted from said calling station to said called station, and wherein said called station comprises:

detecting means for detecting electrical noise generated by said actuating means.

DESCRIPTION OF THE ACCOMPANYING DRAWINGS

DESCRIPTION OF THE EMBODIMENTS

Figure 1:
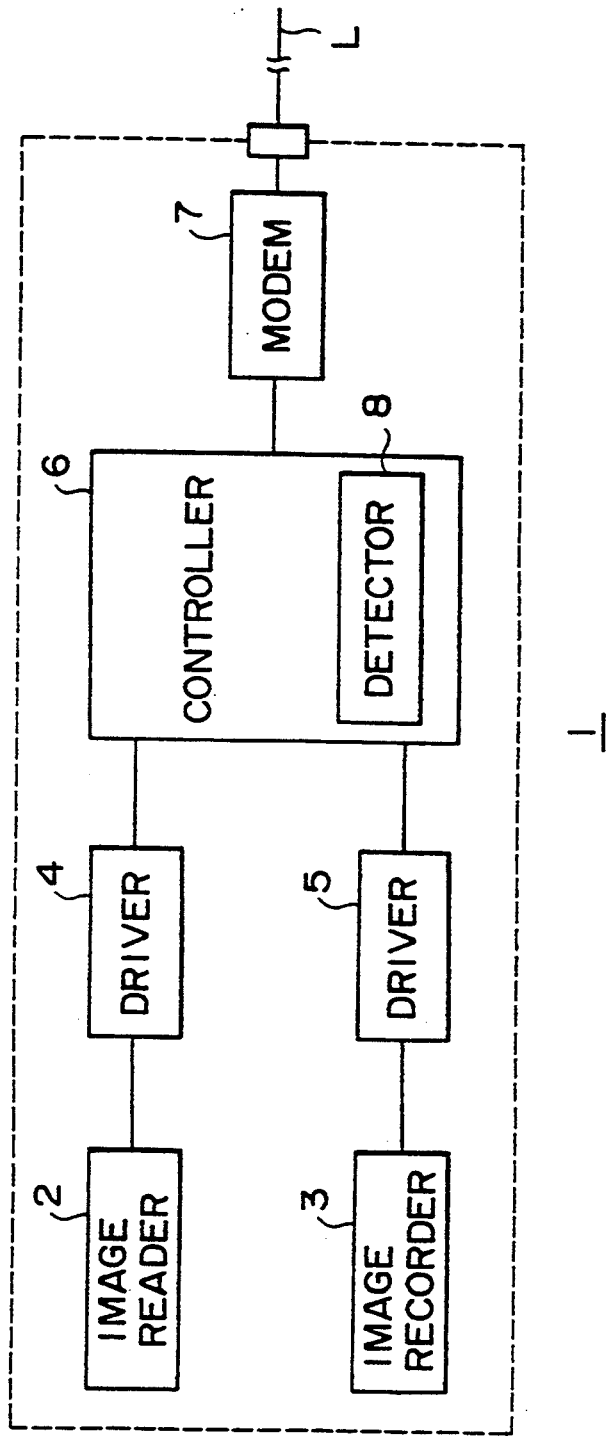
FIG. 1 is a block diagram of a facsimile device according to the present invention.

As shown in FIG. 1, a facsimile device 1 according to the present invention has an Image reader 2 for reading image data to be transmitted, an Image recorder 3 for recording received image data on a sheet, a pair of drivers 4, 5 Including respective actuators such as motors for actuating the document reader 2 and the image data recorder 3, respectively, a controller 6 for controlling the drivers 4, 5 and other elements in the facsimile device 1, and a modem 7 for modulating image data to be transmitted and demodulating image data that is received. The controller 6 includes a detector 8 for detecting the level of noise contained in received signals. The facsimile device 1 can be connected to another similar facsimile device through a line L for transmitting image data to and receiving image data from the other facsimile device.

Operation of the facsimile device 1 will be described below with reference to FIG. 2.

Figure 2:
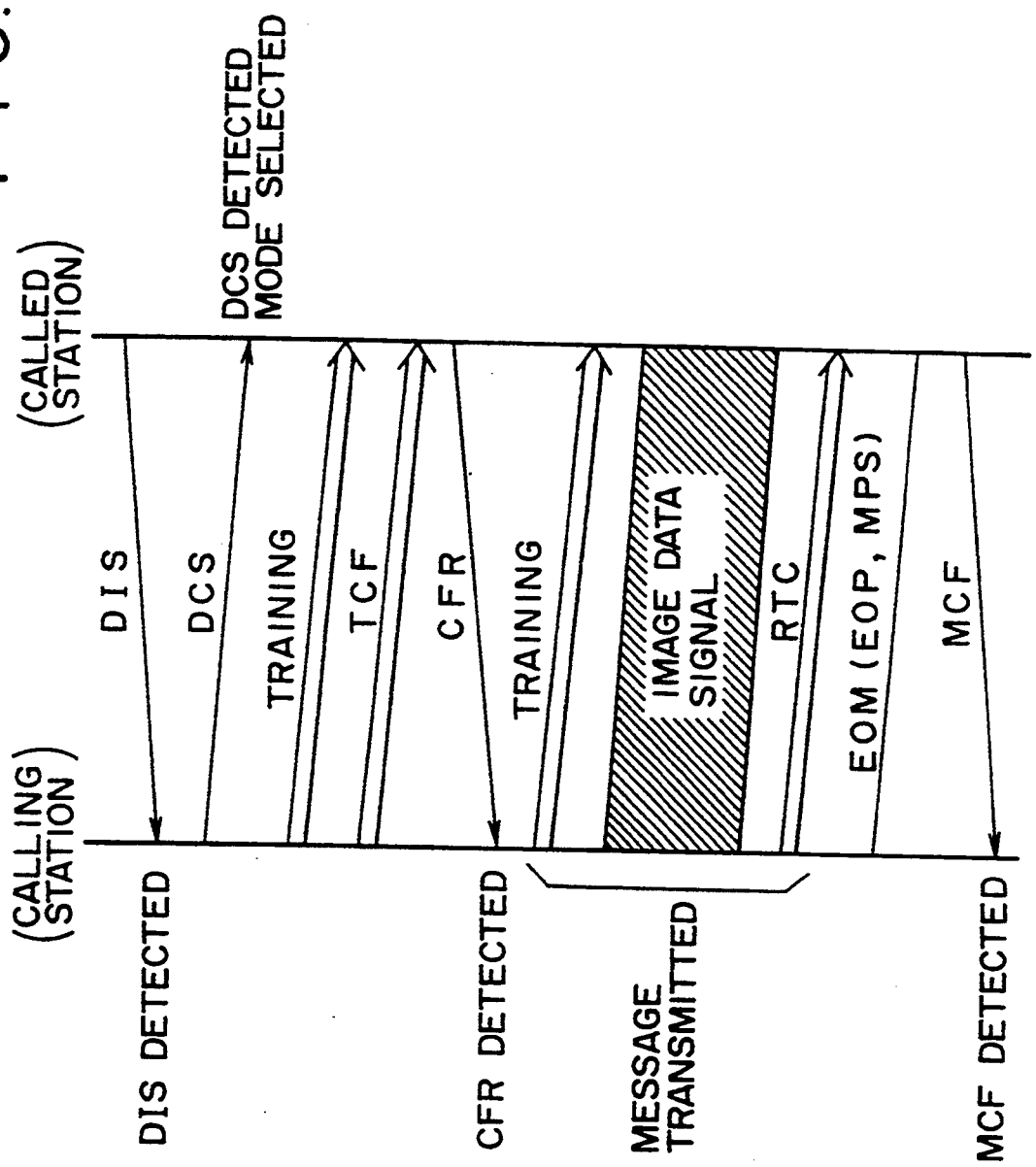
FIG. 2 is a diagram of a transmission control sequence showing protocol signals including handshake and image signals exchanged between two connected facsimile devices.

FIG. 2 shows a transmission control sequence with protocol signals or control signals including handshake signals exchanged between calling and called facsimile devices.

Each of the calling and called stations is composed of the facsimile device 1. When a connection is established between the calling and called stations through the line L, the called station sends a DIS (digital identification signal) signal indicative of its own function to the calling station. In response to the DIS signal, the calling station transmits a DCS (digital command signal) signal which sets the function and indicates a transmission mode to the called station. The calling station subsequently transmits a modem training signal and a TCF signal to the called station. In response to the modem training signal, the called station sets up an automatic equalizer which compensates for an error signal that may be produced due to a distortion of the line L. The called station also checks the condition of the line L based on the received TCF signal.

While transmitting the TCF signal, the calling station energizes the motor of the driver 4 for a predetermined period of time. Therefore, the TCF signal transmitted from the calling station contains electric device noise produced by the energized motor. The controller 6 of the called station detects the electric device noise contained within the received TCF signal. If the level of the detected electric device noise is of a low level, or the condition of the line L is normal as represented by the TCF signal, and the called station is ready to receive image data, then the called station sends a CFR (confirmation to receive) signal to the calling station. On the other hand, if the level of the detected electric device noise is of a high level, or the condition of the line L is bad and the received TCF signal contains a bit error, then the called station sends an FTT (failure to train) signal to the calling station. In response to the FTT signal, the calling station retransmits the modem training signal to train the modem 7 again.

After receiving the CFR signal from the called station, the calling station transmits a modem training signal again and then transmits an image data signal to the called station. More specifically, image data borne by a document to be transmitted is read by the image reader 2 of the facsimile device 1 as the calling station, and encoded into an image data signal. The image data signal is then modulated by the modem 7, and the modulated image data signal is transmitted through the line L to the facsimile device 1 at the called station. In the facsimile device 1 at the called station, the received image data signal is demodulated by the modem 7, then decoded by the controller 6 and recorded on a recording medium such as a recording sheet.

After having transmitted one page of image data, the calling station transmits an RTC (return to control) signal to indicate a return to the transmission control sequence. If there Is a succeeding document to be transmitted, then the calling station transmits an MPS (multipage signal) to the called station. If there is a mode change such as a change of linear density, then the calling station transmits an EOM (end of message) signal to the called station. If the page that has been transmitted is the final page, then the calling station transmits an EOP (end of procedure) signal to the called station.

When all image data have been received, the called station returns an MCF (message confirmation) signal to the calling station, indicating that the image data has been properly received.

Figure 3:
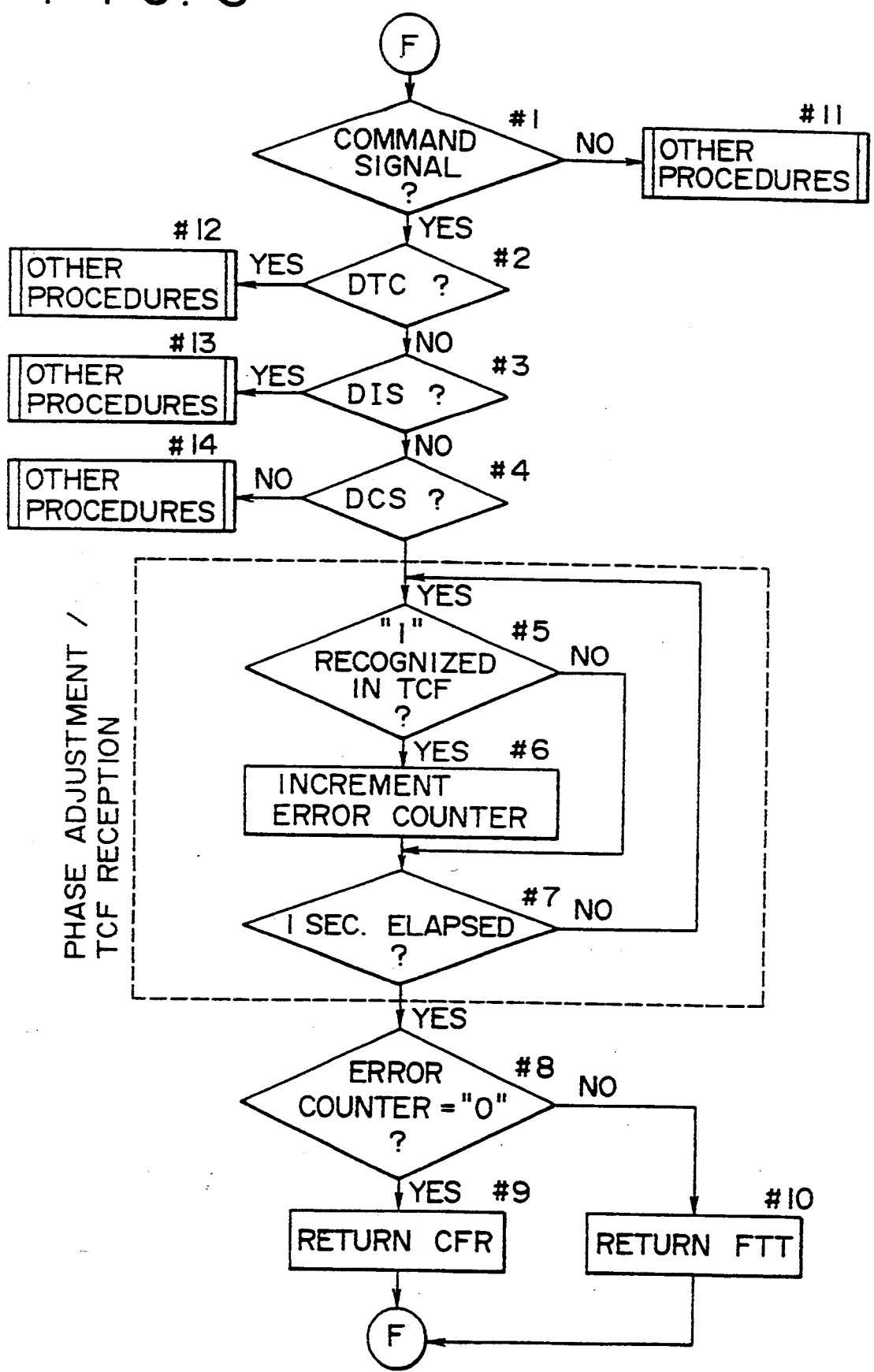
FIG. 3 is a flowchart of a signaling procedure of the facsimile device.

The above signaling procedure in the facsimile device 1 will be described below with reference to FIG. 3. The signaling procedure is carried out as a control sequence employing binary signals. FIG. 3 shows a phase-B premessage procedure in which the function of the other facsimile device is identified, a selected condition is commanded, and a ready-to-receive condition is confirmed, before image data or message is transmitted.

The signaling procedure that is carrled out by the called statlon shown in Flg. 2 will be described below. If a signal transmitted from the calling statlon is a command signal in a step #1, then the controller 6 determines whether the signal is a DTC (digital transmit command) signal or not in a step #2. If the signal is not a DTC signal, then the controller 6 determines whether the signal is a DIS signal or not in a step #3. If the signal is not a DIS signal, then the controller 6 determines whether the signal is a DCS signal or not in a step #4. If the signal is a DCS signal, then control goes to a flow sequence (steps #5 through #7), indicated by the broken line, for adjusting phase and receiving a TCF signal to check the condition of the line L.

The TCF signal has a signal format in the form of a succession of 0s. If "1" is recognized in the received TCF signal in a step #5, then the controller 6 increments an error counter in a step #6. Then, the controller 6 determines whether one second has elapsed in a step #7. If not, control goes back to the step #5. Therefore, the loop of the steps #5, #6 is repeated until one second elapses. If "1" is not recognized in the received TCF signal in the step #5, then control jumps to the step #7. If one second has elapsed in the step #7, then the controller 6 determines whether the count of the error counter is "0" or not in a step #8. If the count of the error counter is "0", then the controller 6 returns a CFR signal to the calling station in a step #9 for normal data communication. If the count of the error counter is not "0", then the controller 6 returns an FTT signal to the calling station in a step #10 to request a modem training signal again. When the routine of training the modem 7 again is repeated, the transmission rate, i.e., the rate at which image data is to be transmitted from the calling station, is successively reduced from 9600 bps to 7200 bps, 4800 bps, and 2400 bps. In this manner, the transmission rate can be switched to a rate that matches the level of device noise produced when the TCF signal is transmitted and received.

If the signal transmitted from the calling station is not a command signal in the step #1, then control goes to a step #11 for other communication procedures. If the signal is a DTC signal in the step #2, then control goes to a step #12 to transmit a response signal for polling operation with respect to a mode setting command from the calling station. If the signal is a DIS signal in the step #3, then control goes to a step #13 to return a capability identification signal from the called station in response to a signal representing the capability of the calling station. If the signal is a DCS signal in the step #4, then control goes to a step #14 to return an error correcting signal for correcting an error of the digital command signal.

Figure 4:
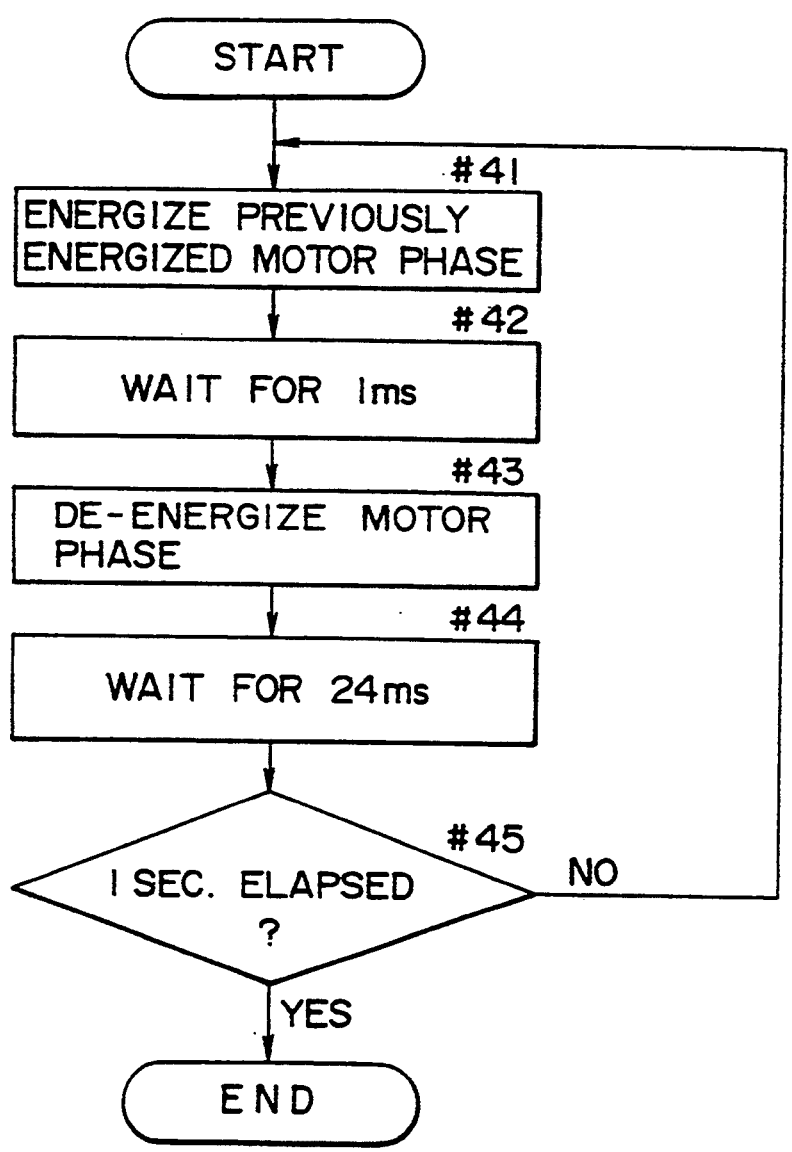
FIG. 4 is a flowchart of a process of controlling a motor in the facsimile device while a TCF signal is being transmitted.

FIG. 4 shows a process of controlling the motor of the driver in the facsimile device of the calling station during the flow sequence for adjusting phase and receiving a TCF signal. As shown in FIG. 4, while a TCF signal is being transmitted from the calling station, the controller 6 of the called station energizes a previously energized phase of the motor in a step #41, and then waits for 1 ms in a step #42. Thereafter, the controller 6 de-energizes the energized phase of the motor in a step #43, and then waits for 24 ms in a step #44. The steps #41 through #44 are looped until one second elapses in a step #45. Therefore, while a TCF signal is being transmitted from the calling station, a load, i.e., the motor, which is not required to be energized otherwise, is energized to produce device noise, so that the TCF signal contains such device noise.

Heretofore, a large load such as a motor for feeding a recording sheet is energized when image data are transmitted, but not energized while a TCF signal is being transmitted. Consequently, while a TCF signal is being transmitted, the condition of the line is checked with almost no level of device noise being produced. Since a higher level of device noise is produced by the large load that is energized when image data is transmitted, communication or decoding errors tend to occur during transmission of the image data. According to the present invention, however, the motor is energized while a TCF signal is transmitted, and the line is checked with motor-induced device noise produced at a level close to the device noise level that is generated when image data is actually transmitted. Since the image data is transmitted at a rate that matches the device noise level detected when the line was checked with the TCF signal, any possible communication or decoding errors are reduced. While a TCF signal is being transmitted, a previously energized phase of the motor which has not been active up to the present time is energized, and hence the motor is prevented from actuating the facsimile device into unnecessary operation.

The source of device noise is not limited to motors for feeding documents and recording sheets, but may include other actuators or electric components including an oscillator and a solenoid which tend to generate electrical noise when energized to transmit and receive image data.

What is claimed is:

1. A facsimile device used to communicate data through a modem comprising:
    image recording means for recording said data;
    actuating means energizable when said data is communicated for actuating the image recording means when the actuating means is energized:
    detecting means for detecting electrical noise generated by said actuating means when said actuating means is energized; and
    control means for energizing said actuating means in response to the communication of a signal to check the communication line, said control means controlling a rate at which said data is to be communicated through the communication line depending on the level of electrical noise that is generated by said actuating means.

2. The facsimile device of claim 1 further comprising image recording means for recording said data, said actuating means comprising a motor for actuating said image recording means.

3. The facsimile device of claim 1, wherein said detecting means comprises means for detecting electrical noise generated by said actuating means.

4. The facsimile device of claim 1, wherein said signal comprises a TCF signal.

5. The facsimile device of claim 4, wherein said TCF signal is recommunicated by said facsimile device when said detecting means detects that said level of electrical noise is higher than a predetermined value, said TCF signal being recommunicated at a rate that is lower than a previous rate.

6. A facsimile system for communicating data from a calling station to a called station over a communication line, comprising:
    image reading means for reading data to be communicated from said calling station to said called station;
    first actuating means for actuating said image reading means to read said data at said calling station;
    image recording means for recording data communicated from said calling station to said called station;
    second actuating means for actuating said image recording means to record said data at said called station;
    detecting means for detecting electrical noise generated by at least one of said first and second actuating means; and
    control means for transmitting a signal, said control means energizing said at least one of said first and second actuating means in response to said signal.

7. The facsimile system of claim 6 wherein said control means energizes said second actuating means in response to said signal, and said detecting means detects electrical noise generated by said second actuating means.

8. The facsimile system of claim 7, wherein said signal comprises a TCF signal.

9. The facsimile system of claim 8, wherein said TCF signal is recommunicated when said detecting means detects that said electrical noise is higher than a predetermined value, said TCF signal being recommunicated at a rate that is lower than a previous rate.

10. A facsimile system used to communicate data from a calling station to a called station wherein said called station comprises:
    image recording means for recording data communicated from said calling station to said called station;
    actuating means for actuating said image recording means to record said data at said called station; and
    detecting means for detecting electrical noise generated by said actuating means;
    wherein said calling station comprises:
    image reading means for reading data to be communicated from said calling station to said called station; and
    control means for transmitting a signal, said control means energizing said actuating means when said signal is communicated from said calling station to said called station.

11. The facsimile system of claim 10, wherein said actuating means comprises a motor for actuating said image recording means.

12. The facsimile system of claim 10, wherein said signal comprises a TCF signal, said TCF signal being recommunicated by said called station when said detecting means detects that said level of electrical noise is higher than a predetermined value, said TCF signal being recommunicated at a rate that is lower than a previous rate.

13. A facsimile device used to communicate data through a modem comprising:
    image recording means for recording said data;
    an actuator energizable when said data is communicated for actuating the image recording means when said actuator is energized:
    a detector for detecting electrical noise generated by said actuator when said actuator is energized; and
    a control unit for energizing said actuator in response to the communication of a signal to check the communication line, said control unit controlling a rate at which said data is to be communicated through the communication line depending on the level of electrical noise that is generated by said actuator.

14. The facsimile device of claim 13 further comprising an image data recorder, said actuator comprising a motor for actuating said image data recorder.

15. The facsimile device of claim 13, wherein said detector detects electrical noise generated by said actuator.

16. The facsimile device of claim 13, wherein said signal comprises a TCF signal.

17. The facsimile device of claim 16, wherein said TCF signal is recommunicated by said facsimile device when said detector detects that said level of electrical noise is higher than a predetermined value, said TCF signal being recommunicated at a rate that is lower than a previous rate.

18. A facsimile system for communicated data from a calling station to a called station over a communication line, comprising:
   an image data reader for reading data to be communicated from said calling station to said called station;
   a first actuator for actuating said image data reader to read said data at said calling station;
   an image data recorder for recording data communicated from said calling station to said called station;
   a second actuator for actuating said image data recorder to record said data at said called station;
   a detector for detecting electrical noise generated by at least one of said first and second actuators; and
   a control unit for transmitting a signal, said control unit energizing said at least one of said first and second actuators in response to said signal.

19. The facsimile system of claim 18, wherein said control unit energizes said second actuator in response to said signal, and said detector detects electrical noise generated by said second actuator.

20. The facsimile system of claim 19, wherein said signal comprises a TCF signal.

21. The facsimile system of claim 20, wherein said TCF signal is recommunicated when said detector detects that said electrical noise is higher than a predetermined value, said TCF signal being recommunicated at a rate that is lower than a previous rate.

22. A facsimile system used to communicate data from a calling station to a called station wherein said called station comprises:
   an image data recorder for recording data communicated from said calling station to said called station;
   an actuator for actuating said image data recorder to record said data at said called station; and
   a detector for detecting electrical noise generated by said actuator;
   wherein said calling station comprises:
   an image data reader for reading data to be communicated from said calling station to said called station; and
   a control unit for transmitting a signal, said control unit energizing said actuator when said signal is communicated from said calling station to said called station.

23. The facsimile system of claim 22, wherein said actuator comprises a motor for actuating said image data recorder.

24. The facsimile system of claim 22, wherein said signal comprises a TCF signal, said TCF signal being recommunicated by said called station when said detector detects that said level of electrical noise is higher than a predetermined value, said TCF signal being recommunicated at a rate that is lower than a previous rate.

25. A method of facsimile data communication through a modem comprising the steps of:
   communicating a signal to check a communication line;
   energizing an actuator in response to said communicating step;
   recording image data in response to said actuator being energized;
   detecting electrical noise generated by said step of energizing said actuator; and
   controlling a rate at which said data is to be communicated through the communication line depending on the level of electrical noise that is detected by said detecting step.

26. The method of facsimile data communication of claim 25 wherein said energizing step is responsive to said controlling step.

* * * * *